Nov. 18, 1941.      G. K. TOLNAI      2,263,371
DRIVING MEANS
Filed March 4, 1940
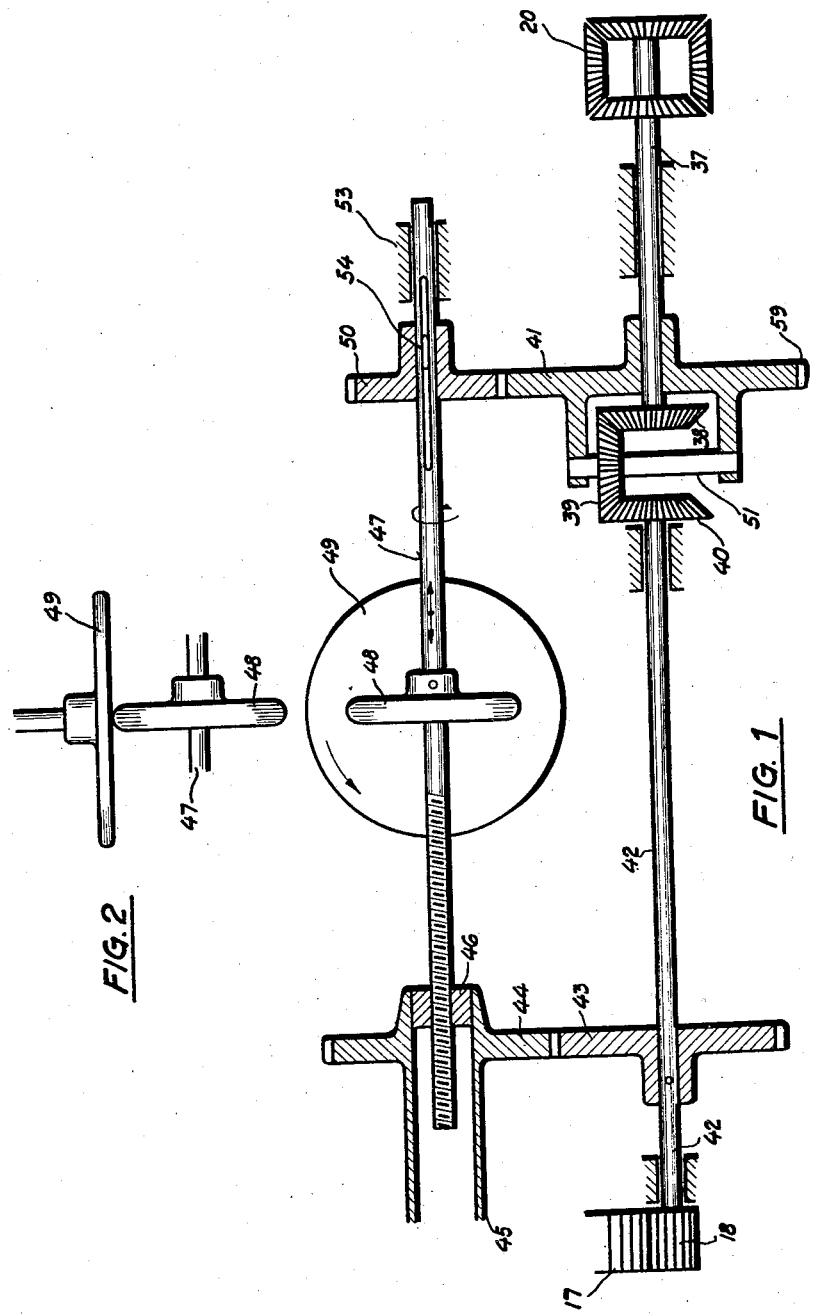
Inventor
Gabor K. Tolnai
by Sommers + Young
Attorneys Patented Nov. 18, 1941

2,263,371

UNITED STATES PATENT OFFICE 2,263,371

DRIVING MEANS

Gábor Kornél Tolnai, Stockholm, Sweden, assignor to Aktiebolaget Gerh. Arehns Mekaniska Verkstad, Stockholm, Sweden, a joint-stock company of Sweden Application March 4, 1940, Serial No. 322,220
In Sweden March 1, 1939

4 Claims. (Cl. 74—395)

This invention relates to driving means, and it is an object of the invention to provide means for rapidly and easily controlling the rotary velocity of a member.

Further objects and advantages of this invention will become apparent in the following detailed description.

In the accompanying drawing:

Fig. 1 is a main view of an embodiment of the invention; and

Fig. 2 is a view of part thereof.

Referring to the drawing, a driving shaft 37 is connected to driving means (not shown) by means of a reversing gear 20 and to a shaft 42 by means of a sun and planet gear. The sun and planet gear has a bevelled sun gear 38 secured to the shaft 37 and gear 38 meshes with the planet gear 39. The planet gear 39 is loosely journalled on a shaft 51 secured to a rotatable disc 41 which has a toothed peripheral rim 59 and is loosely journalled on the shaft 37. Another sun gear 40 is secured to one end of the shaft 42 to the other end of which is secured a pinion 18 meshing with a gear wheel 17. The gears 38, 39 and 40 have the same sizes. A gear wheel 43 is keyed to the shaft 42 and meshes with another gear wheel 44 of the same size as the gear wheel 43. The hub of the gear wheel 44 forms a sleeve 45, into which is pressed a nut 46. The threaded end of a speed control shaft 47 is screwed into the nut 46 and the shaft 47 carries a friction wheel 48 secured thereto. The friction wheel 48 rests upon a friction disc 49 which is driven at a uniform speed by a motor (not shown). The disc 49 may, however, be driven intermittently or at variable speed, if desired. The shaft 47 is axially displaceable and rotatably journalled in a bearing 53, so that the friction wheel 48 can be displaced in the radial direction of the disc 49 towards, from and past the central position shown in the drawing. A gear wheel 50 is connected by a key 54 to the shaft 47, so that said shaft may slide within the gear wheel 50 but not rotate relative to same. Means (not shown) is provided for axially supporting the hub 45 and gear wheel 50. Thus the gear wheel 50 always meshes with the toothed rim 59 of the wheel 41, which rim has twice as many teeth as the gear wheel 50. If the shaft 37 is started, the shaft 42 will start rotating in the opposite direction, and its rotary movement is transferred by the gear wheel 43 to the gear wheel 44. When being rotated the nut 46 screws the shaft 47 into the hollow hub 45, whereby the friction wheel 48 is displaced to the left from its central position on the friction disc 49. Thereby the wheel 48 is caused to rotate at a velocity that increases in direct relationship to its displacement, i. e. its distance from the center of the disc 49. Thereby the shaft 47 is rotated and the gear wheel 50 drives the toothed disc 41 in a direction opposite to the rotary direction of the shaft 37. Thereby the planet gear 39 is moved in a circular path around the gear 38, so that a certain amount of rotary velocity is added to the rotary velocity that the planet gear obtains from the shaft 37. The amount of such additional velocity depends on the relative positions of the wheels 48 and 49. This additional velocity is transferred to the gear wheel 40 which obtains still another increase of rotary velocity, as the planet gear 39 moves around the gear 40 in the rotary direction of the latter. When the shaft 37 is arrested the friction wheel 48 will occupy an eccentric position (to the left) upon the rotating disc 49, so that the shaft 47 will still revolve and drive the toothed disc 41, so that the planet gear 39 continues rotating around the sun gears and drives the shaft 42 incessantly. Thus the gear 17, 18 is now driven at a speed depending on the speed of the disc 49 and of angular movement or number of revolutions previously imparted to the shaft 37. A single short and rapid angular displacement of the shaft 37 will cause a continuous relatively slow rotary movement of the gear 17, 18, and at each such step of movement the rotary speed of the shaft 42 will be increased correspondingly. This mode of operation can be utilized to transfer stepwise rotary movements of the shaft 37 (imparted by a ratchet wheel, for instance) into a uniform rotary movement of the gear 17, 18. In case the shaft 37 is rotated in the reversed direction by the reversing gear 20 the gear 17, 18 will rotate in the reversed direction, and thereby the friction wheel 48 will ride on the right hand portion of the friction disc 49.

I claim:

1. In a driving device, a rotary nut, a rotary threaded longitudinally displaceable speed control shaft screwed into said nut and having a friction roller mounted thereon, a frictional driving disc engaging said roller to rotate said shaft at a speed proportional to the radial distance of the engagement of said roller with said disc from the center of said disc, a second rotary shaft, a train interconnecting said threaded shaft and said nut, said train comprising a planet gear and a first sun gear of a differential gearing, said differential gearing also having a second sun gear, said first sun gear being mounted on said second rotary shaft, said train comprising also a gear for driving said planet gear from said threaded shaft to ride on said first sun gear and drive said first sun gear together with said second shaft, said train comprising also a gear interconnecting said second shaft and said nut, said train rotating said nut and said speed control shaft at the same velocity when said second sun gear is not turned, said second sun gear, when being turned, changing the rotary speed of said second shaft to cause relative rotary movement of said nut and said speed control shaft and thereby displacing said control shaft longitudinally to change its rotary speed.

2. In a driving device, a rotary nut, a rotary threaded shaft screwed into said nut, said shaft having a friction disc, a rotary member for engaging said disc to rotate said shaft by friction, said shaft being displaceable longitudinally to adjust the position of said disc on said driving member and thereby to adjust the rotary speed of said shaft, a train interconnecting said nut and said shaft, said train having a planet gear and a first sun gear of a differential gearing which is adapted to rotate said nut and also has a second sun gear controlling the rotary speed of said shaft, said shaft driving said planet gear to ride on said second sun gear and rotate said nut at the same speed as said shaft when said second sun gear is not turned, said second sun gear when turned rotating said nut relative to said shaft to displace said shaft together with said friction disc longitudinally and thereby to change the rotary speed of said shaft.

3. In a driving device, a rotary driving member, two rotary members screwed to one another, one of said rotary members being rotated by said driving member at a speed depending on the relative positions of both said rotary members obtained by screw action, and a train interconnecting said rotary members and comprising a planet gear and a sun gear of a differential gearing, said gearing also having a second sun gear acting as a speed control member, said train causing both said rotary members to rotate at the same speed to prevent their relative movement by screw action when said second sun gear is not turned, said second sun gear, when being turned, to relatively, rotate both said rotary members, adjusting their relative positions, and thereby also their rotary speed.

4. Driving means having a nut, a shaft screwed into said nut, said shaft and said nut being relatively longitudinally displaceable, means for rotating said shaft at a speed depending on the relative longitudinal displacement of said shaft and nut, a differential gear having a planet gear and two sun gears, said planet gear being operable to be driven from said shaft to ride on one of said sun gears and rotate the other sun gear, and means including said planet gear and said other sun gear and operably interconnecting said shaft and said nut to rotate them at the same velocity when the first sun gear is not turned.

GÁBOR KORNÉL TOLNAI.